Patented Oct. 27, 1931

1,829,480

UNITED STATES PATENT OFFICE

IVAN GUBELMANN AND CLYDE O. HENKE, OF SOUTH MILWAUKEE, WISCONSIN, ASSIGNORS TO THE NEWPORT COMPANY, OF CARROLLVILLE, WISCONSIN, A CORPORATION OF DELAWARE

ORGANIC ESTER AND PROCESS OF MAKING THE SAME

No Drawing.  Application filed July 2, 1928.  Serial No. 290,025.

This invention relates to an ester of abietic acid and a tetrahydronaphthol and to a process of making the ester.

It is an object of this invention to provide a simple and practical method of preparing tetrahydronaphthol abietate, which is a valuable material for use in lacquers, varnishes, paints, and for any of the general uses for which esters of abietic acid are employed.

Other and further important objects of this invention will become apparent from the following description and appended claims.

We have now found that tetrahydronaphthol abietate may be prepared in a simple manner from abietic acid and tetrahydronaphthol without the necessity of using any condensing agent. The esterification goes practically to completion within a few hours, probably due to the high temperature at which the reaction can be carried out on account of the high boiling points of the reacting substances and reaction product.

Without limiting our invention to any particular procedure, the following example in which parts by weight are given, will serve to illustrate our method in its preferred form.

*Example.*—A mixture of 210 parts of abietic acid and 105 parts of tetrahydronaphthol, preferably that prepared by known methods from tetrahydronaphthalene according to Schroeter, Annalen der Chemie, vol. 426, pages 83 to 84 and 90 to 91, and having most probably the following structure:

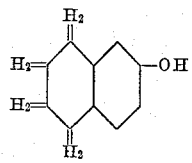

Aryl-tetrahydro-2-naphthol is heated to 300 to 350° C. for several hours. At the end of 4 to 5 hours' heating, the esterification is practically complete, the mass containing but a relatively low percentage of unchanged abietic acid. Upon further heating, the abietic acid content may be reduced, but it is preferred to remove practically all of the residual abietic acid by washing with alkali, such as dilute caustic soda, and subjecting the esterification mass to fractional distillation in vacuo to recover the tetrahydronaphthol abietate. Alternatively, the esterification mass can be fractionally distilled in vacuum without first removing the abietic acid by alkali washing.

Abietic acid is preferred for use as starting material, but any abietic acid containing material such as crude or vacuum distilled rosin high in abietic acid content may be employed. Obviously the products obtained from the various sources of abietic acid will vary in purity depending to some extent upon the relative purity of the starting material. For some purposes, the crude esterification mass has been found satisfactory without subsequent purification.

Tetrahydronaphthol abietate as prepared is a semi-fluid mass setting practically solid when chilled to room temperature and showing no tendency to crystallize even after standing for days. It is slightly fluorescent and has a high boiling point, but may be distilled in vacuo unchanged. At 2 to 5 mm. vacuum, the boiling point range lies between 300 and 320° C.

The physical properties of tetrahydronaphthol abietate render it superior to many of the esters or ester gums of abietic acid for use in lacquers and the like.

We are aware that numerous details of the process may be varied through a wide range without departing from the principles of this invention, and we, therefore, do not purpose limiting the patent granted hereon otherwise than necessitated by the prior art.

We claim as our invention:

1. The process of preparing tetrahydronaphthol abietate, which comprises heating together abietic acid containing material and a tetrahydronaphthol.

2. The process of preparing tetrahydronaphthol abietate, which comprises heating together abietic acid and a tetrahydronaphthol.

3. The process of preparing tetrahydronaphthol abietate, which comprises heating together abietic acid containing material and a tetrahydronaphthol to a temperature of 300 to 350° C. and recovering the tetrahydronaphthol abietate from the esterification mass.

4. The process of preparing tetrahydronaphthol abietate, which comprises heating together abietic acid and a tetrahydronaphthol to a temperature of 300 to 350° C. and recovering the tetrahydronaphthol abietate from the esterification mass.

5. The process of preparing tetrahydronaphthol abietate, which comprises heating abietic acid and a tetrahydronaphthol to a temperature of 300 to 350° C. until esterification is substantially complete, washing the mass with alkali to remove unchanged abietic acid and fractionally distilling the mass in vacuo to recover tetrahydronaphthol abietate.

6. As a new article of commerce, tetrahydronaphthol abietate.

7. The process of preparing Ar- tetrahydronaphthol abietate which comprises heating together abietic acid and an Ar- tetrahydronaphthol.

8. The process of preparing Ar- tetrahydronaphthol abietate, which comprises heating together abietic acid and an Ar- tetrahydronaphthol to a temperature of 300 to 350° C. and recovering the tetrahydronaphthol abietate from the reaction mass.

9. The process of preparing Ar- tetrahydro-2-naphthol abietate which comprises heating together abietic acid and 2-tetrahydronaphthol.

10. The process of preparing Ar- tetrahydro-2-naphthol abietate which comprises heating together abietic acid and 2-tetrahydronaphthol to a temperature of 300 to 350° C.

11. As a new article of commerce, Ar- tetrahydronaphthol abietate.

12. As a new article of commerce, material containing a tetrahydronaphthol abietate obtained by heating rosin with a tetrahydronaphthol.

In testimony whereof we have hereunto subscribed our names at Carrollville, Milwaukee County, Wis.

IVAN GUBELMANN.
CLYDE O. HENKE.